L. W. Baker,
Bread Cutter.
N° 29,558.   Patented Aug. 14, 1860

Witnesses
F. R. Hale Jr.
Samuel J. Shaw

Inventor:
Levi W. Baker

UNITED STATES PATENT OFFICE.

LEVI W. BAKER, OF MARLBORO, MASSACHUSETTS.

BREAD-SLICER.

Specification of Letters Patent No. 29,558, dated August 14, 1860.

*To all whom it may concern:*

Be it known that I, LEVI W. BAKER, of Marlboro, in the county of Middlesex and State of Massachusetts, have invented a Bread-Slicing Machine or Apparatus, and do hereby declare the same to be fully described and represented in the following specification and the accompanying drawings, of which—

Figure 1:
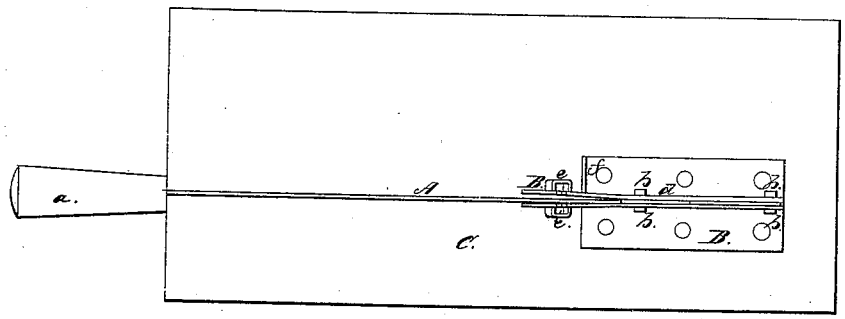
Figure 2:
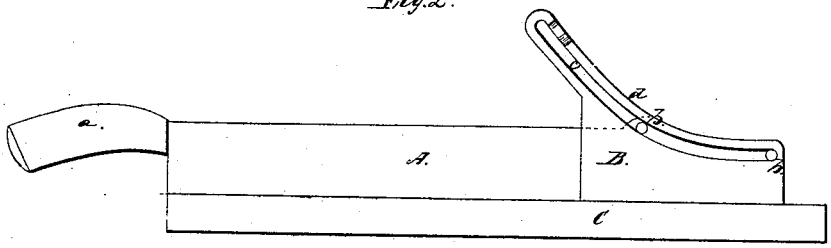
Figure 3:
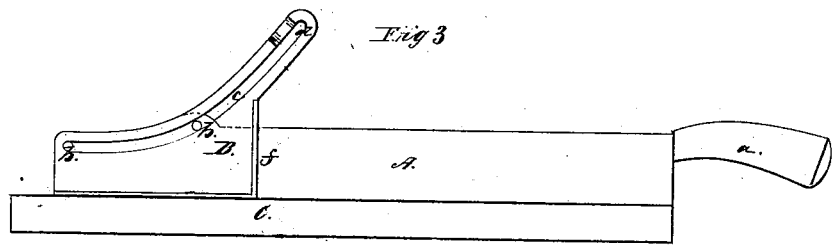
Figure 4:
Figure 5:
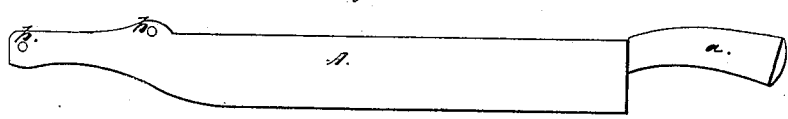

Figure 1, is a top view and Figs. 2, and, 3, side elevations of it. Fig. 4, is a side view, and Fig. 5, a top view of the knife as separated from its carrier.

In the drawings, A, denotes a knife provided with a handle *a*, at one end and two stud pins, *b*, *b*, projecting from opposite sides of it near its other end. These studs are to extend into two curved slots, *c*, *c*, made respectively through the two vertical plates, *d*, *d*, of a knife carrier, or frame, B, elevated upon a board or table C. An opening, *e*, extends out of each of the slots as shown in Fig. 1, the same being in order that the studs may be severally entered into or withdrawn from the slots during the process of either inserting the knife between the plates, *d*, *d*, or removing it therefrom. The carrier may be provided with a rest or abutment *f*, against which, the loaf of bread while being sliced may be borne.

In operating with this machine, a loaf of bread is to be laid on the board, C, and against the rest, *f*, the knife being moved up so as to allow the loaf to be passed underneath its cutting edge. On depression of the knife it will be caused to pass through the loaf with a drawing stroke. The knife operates as a lever with a movable fulcrum.

I am aware that it is not new to cause a knife to have two movements at once, by which it may be caused to operate with a drawing stroke. Therefore I do not claim such.

My invention is an improved means of applying the knife to its supporting standard, whereby such knife can be either readily detached from such standard or applied to it, as circumstances may require. I would remark that my improvement differs essentially from anything shown in the United States Patent No. 3783, for in this latter, the knife is held to its standard by a brace or link hinged to both, such practically rendering the knife difficult of removal from its standard when it may be desirable to have it separated therefrom. With my mode of constructing the knife carrier and making the knife with stationary studs, the connecting parts are not only so applied to the carrier and knife as to be inseparable therefrom and therefore not liable to loss, but they cause the knife to perform the drawing stroke while it is forced downward.

Therefore my improvement and what I claim—

Constructing the knife with the two stud pins, *b*, made to project from its opposite sides, and in constructing the standard or carrier, B, of two vertical plates, *d*, *d*, made with two curved slots, *c*, *c*, and an opening, *e*, leading out of each in the manner explained and represented.

LEVI W. BAKER.

Witnesses:
R. H. EDDY,
F. P. HALE, Jr.